S. T. WILSON.
GRAIN CAR DOOR.
APPLICATION FILED JUNE 6, 1910.
999,354.
Patented Aug. 1, 1911.
2 SHEETS—SHEET 2.
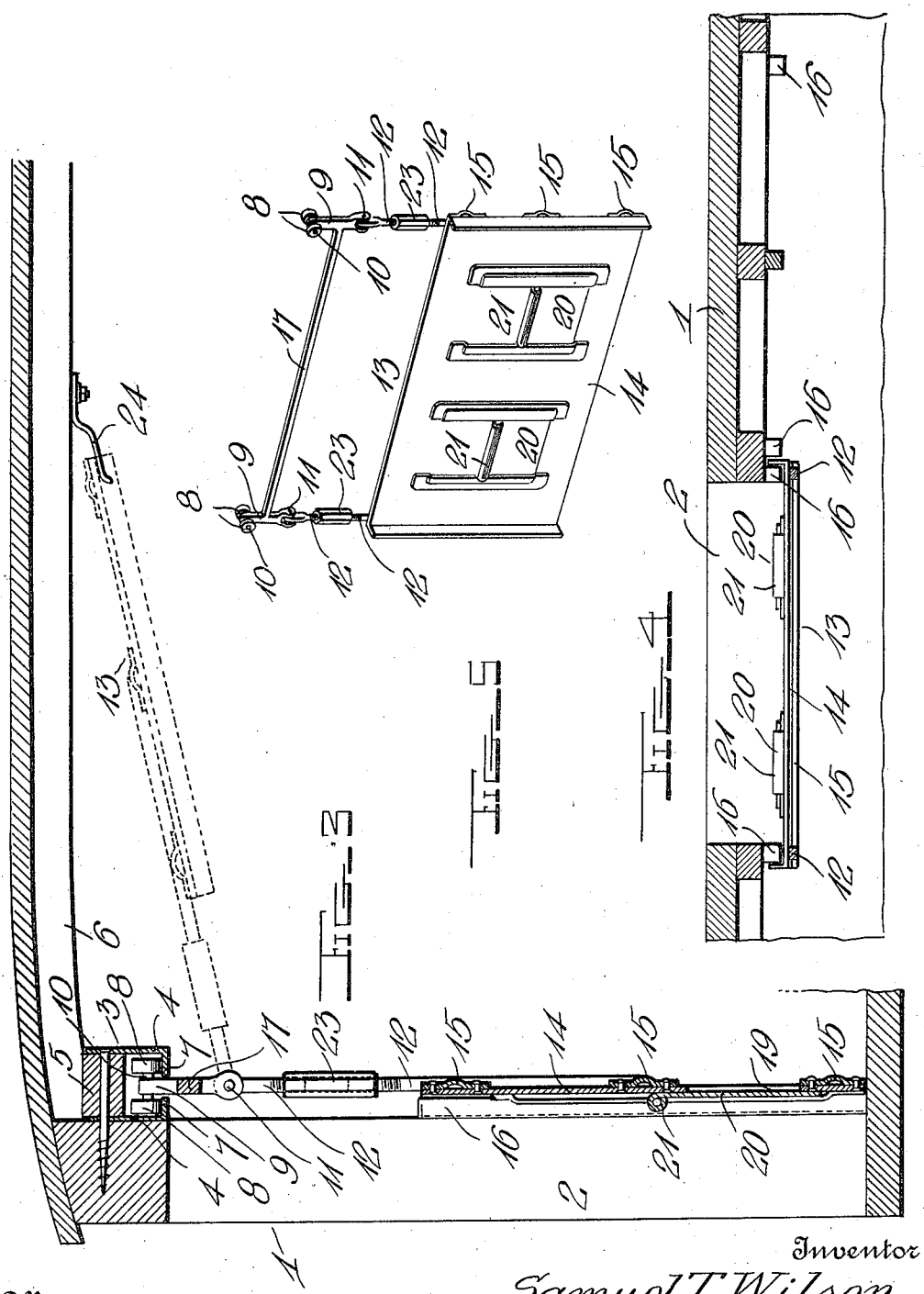
Witnesses
Inventor
Samuel T. Wilson
by H. B. Wilson & Co
Attorneys

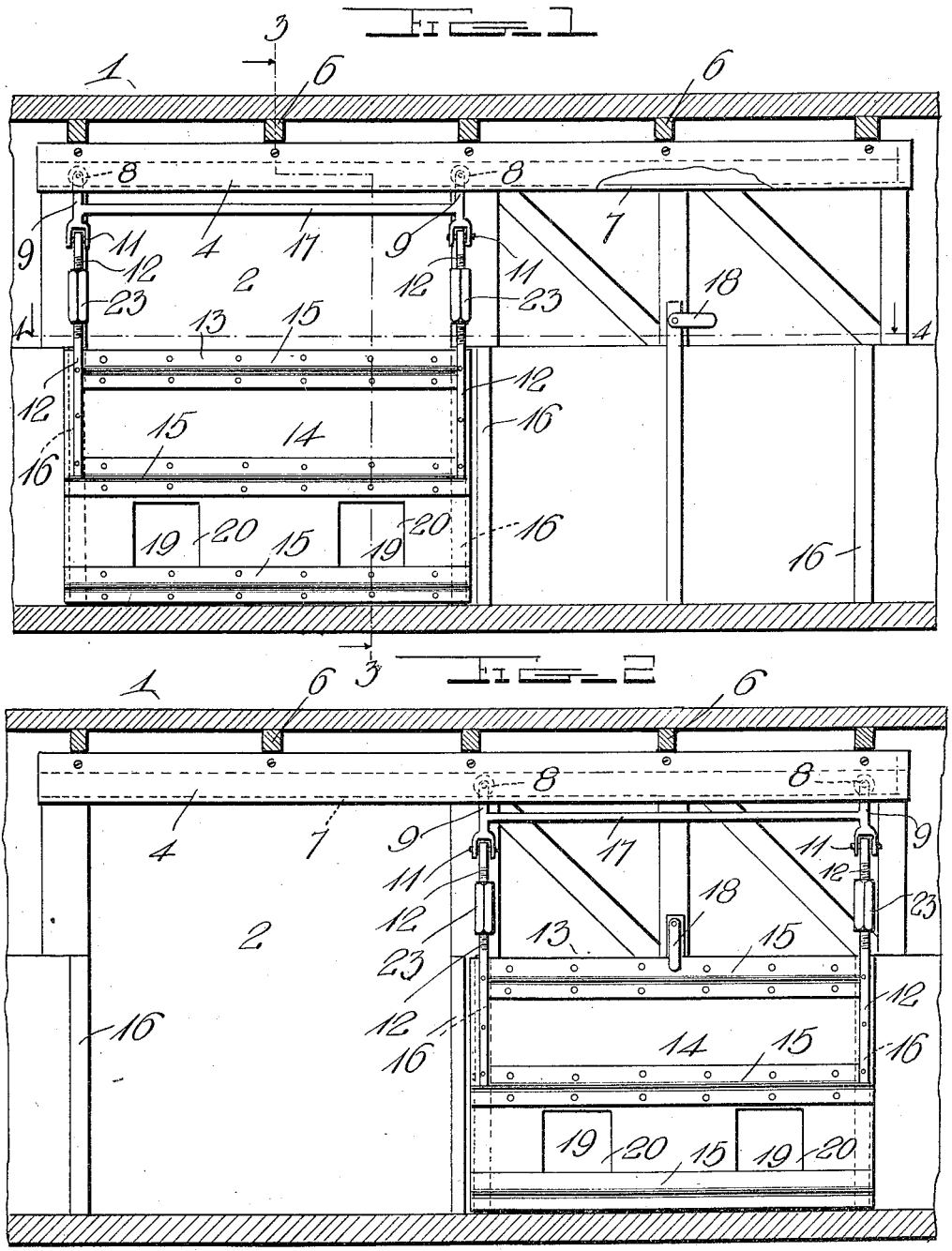

UNITED STATES PATENT OFFICE.

SAMUEL T. WILSON, OF CHARLESTON, WEST VIRGINIA, ASSIGNOR OF ONE-HALF TO C. K. McDERMOTT, OF CHARLESTON, WEST VIRGINIA.

GRAIN-CAR DOOR.

999,354.

Specification of Letters Patent.   Patented Aug. 1, 1911.

Application filed June 6, 1910.   Serial No. 565,251.

*To all whom it may concern:*

Be it known that I, SAMUEL T. WILSON, a citizen of the United States, residing at Charleston, in the county of Kanawha and State of West Virginia, have invented certain new and useful Improvements in Grain-Car Doors; and I do declare the following to be a full, clear, and exact description of the invention, such as will enable others skilled in the art to which it appertains to make and use the same.

This invention relates to improvements in grain car doors and has for its object to provide a car door that will effectively prevent the accidental escape of grain or like substances and at the same time may be readily opened or adjusted to permit the unloading of the grain from the car.

Another object of my invention is to provide a door that is slidably mounted to be longitudinally moved to and from the door opening in the car and is pivotally mounted to allow the door to be swung to an inoperative position near the roof of the car.

With the foregoing and other objects in view, the invention consists of certain novel features of construction, combination and arrangement of parts as will be more fully described and particularly pointed out in the appended claim.

In the accompanying drawings, Figure 1 is a side view of a portion of a freight car equipped with my improved grain car door. Fig. 2 is a similar view of the interior of the car. Fig. 3 is a transverse section throughout the car showing the car door swung into a position near the roof. Fig. 4 is a horizontal longitudinal sectional view on the line 4—4 of Fig. 1, and Fig. 5 is a detail perspective view of the door.

Like reference numerals indicate corresponding parts throughout the several views.

In the accompanying drawings, the numeral 1 designates a freight car of the usual or any desired form, and 2 the usual door opening therein. Suitably secured upon the inner side of the freight car 1 near the top of the car is a longitudinally-disposed guide and suspension track 3, preferably comprising a pair of spaced rails or track sections 4 secured adjacent their upper extremities to a longitudinal beam 5 suspended from a plurality of brackets or beams 6 carried by the car 1. Adjacent their lower extremities the track sections 4 are flanged or bent inwardly as at the top of the car. The track sections 4 are right angularly shaped in cross section and have their inturned portions or flanges forming runways 7 for the rollers 8 carried by door hangers 9. These hangers are the T-shaped ends of a horizontal connecting bar or rod 17 as shown more clearly in Fig. 5. The upper extremity of each hanger 9 projects between the spaced portions or flanges 7 of the track sections 4 and carries a transverse stub shaft 10 on the projecting ends of which latter are rotatably mounted the rollers 8, as will be readily understood on reference to Fig. 3. The lower ends of the vertically disposed hangers 9 are bifurcated and carry pivot pins 11 by means of which the upper ends of car door supporting bars 12 are pivotally mounted in said bifurcated lower extremities of the hangers. The grain car door 13 may be constructed of wood, metal or any desired material, and as herein shown is preferably constructed of the body plate 14 formed of a single sheet of metal, having a plurality of angle irons 15 suitably secured at intervals thereto to reinforce and stiffen the body portion.

The side edges of the door 13 are bent laterally to stiffen the same, and coöperate with spaced upright beams 16 secured to one side of the car and a single beam secured to the other side thereof to prevent the escape of the grain or like material from the interior of the car when the door is closed. The beams or posts 16 also serve to position the grain door in its operative and inoperative position, the side flanges of the car door fitting closely to said posts and overlapping the sides thereof. A suitable latch 18 is provided to retain the car door in its inoperative position adjacent the side of the car.

Adjacent the lower extremity of the body plate 14 of the car door are provided a plurality of spaced wickets 19 to allow the passage of a relatively small quantity of the grain or like material from the car, and said wickets are adapted to be closed by means of slidable gates or doors 20, which are mounted to slide in vertically-disposed guides secured to the body plate of the car door at each side of the wicket openings, and preferably are bent or spaced outwardly from said door to allow the gates 20 to freely slide therein. A suitable handle or rod 21 is arranged upon the gates 20 to allow the same to be readily moved.

The supporting bars 12 are preferably formed in sections with their contiguous end bars threaded and connected by means of a turn-buckle 23 whereby the car door 13 may be vertically adjusted to fit any size door, or to move the grain door 13 away from the bottom of the car to allow the insertion of a conveyer nozzle when it is desired to unload the car.

In practice, my improved grain door may be longitudinally moved upon the overhead track 3 to an out-of-the-way place adjacent the side of the car while the car is being filled with grain or the like, and may then return to its operative position covering the door opening 2 in the freight car, the side flanges of the car overlapping the posts 16 so that the escape of the grain is effectively prevented. When it is desired to remove the contents of the car, one or more of the wickets 20 are opened to allow the grain immediately behind the car door 13 to escape, whereupon the door may swing inwardly upon the pivot pins 11 to a position adjacent the roof of the car and may be held in this position by means of a hook or other suitable retaining device 24. A power shovel, conveyer nozzle, or like delivering means may then be inserted into the car to unload the grain therefrom.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having described my invention, I claim:

The combination with the side wall of a car having a door opening, of a horizontally extending track of channeled formation arranged above the door opening, a door, a horizontal bar having T-shaped ends forming hangers, the latter being vertically disposed and having their upper ends projecting into the channeled track and their lower ends bifurcated, transverse stop shafts in the upper ends of the upright hangers, track rollers mounted on said shafts, and connecting bars having their upper ends pivotally mounted in the bifurcated lower extremities of the hangers and their lower ends connected to said door.

In testimony whereof I have hereunto set my hand in presence of two subscribing witnesses.

SAMUEL T. WILSON.

Witnesses:
SADIE MIDELBURG,
R. L. FRASIER.

---

Copies of this patent may be obtained for five cents each, by addressing the "Commissioner of Patents, Washington, D. C."